United States Patent
Kartalopoulos

(10) Patent No.: US 7,813,899 B2
(45) Date of Patent: *Oct. 12, 2010

(54) METHOD AND CIRCUIT FOR STATISTICAL ESTIMATION

(75) Inventor: Stamatios V. Kartalopoulos, Tulsa, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 206 days.

This patent is subject to a terminal disclaimer.

(21) Appl. No.: 11/603,700

(22) Filed: Nov. 21, 2006

(65) Prior Publication Data

US 2007/0064236 A1 Mar. 22, 2007

Related U.S. Application Data

(63) Continuation of application No. 10/859,672, filed on Jun. 3, 2004, now Pat. No. 7,149,661.

(60) Provisional application No. 60/475,668, filed on Jun. 4, 2003.

(51) Int. Cl.
*G01B 9/02* (2006.01)
(52) U.S. Cl. ................................ 702/189
(58) Field of Classification Search .................. 702/189
See application file for complete search history.

(56) References Cited

U.S. PATENT DOCUMENTS 5,870,211 A 2/1999 Yoshida 6,744,496 B2 6/2004 Audouin et al.
7,149,661 B1 * 12/2006 Kartalopoulos ............. 702/189

OTHER PUBLICATIONS

Per-port Statistical Estimation of Bit Error Rate and Optical Signal to Noise Ratio in DWDM Telecommunications, Stamatios V. Kartalopoulos, PHD., William Professor in Telecommunications Networking, The University of Oklahoma, pp. 1-10.

Factors Affecting the signal Quality in Optical Data Transmission and Estimation Method for BER and SNR, Stamatious V. Kartalopoulos, PhD., William Professor in Telecommunications Networking, Telecommunications Systems, College of Engineering, The University of Oklahoma-Tulsa, Kartalopoulos@ou.edu , pp. 1-5.

Optical Bit Error Rate, Stamatious V. Kartalopoulos, ISBN 0-471-61545-5 © 2004 the Institute of Electrical and Electronics Engineers, Chapter 7, pp. 213-248.

Optical Bit Error Rate, Stamatious V. Kartalopoulos, ISBN 0-471-61545-5 © 2004 the Institute of Electrical and Electronics Engineers, Chapter 8, pp. 249-258.

* cited by examiner

*Primary Examiner*—Tung S Lau
(74) *Attorney, Agent, or Firm*—Dunlap Codding, P.C.

(57) ABSTRACT

A method for determining a quality indication, such as a bit error rate or a signal to noise ratio, of a photonic signal is described. The photonic signal is sampled, and then an estimated quality indication, such as the bit error rate, is calculated utilizing statisical analysis of the sampled photonic signal.

10 Claims, 2 Drawing Sheets

METHOD AND CIRCUIT FOR STATISTICAL ESTIMATION

CROSS REFERENCE TO RELATED APPLICATIONS

The present patent application is a continuation of U.S. Ser. No. 10/859,672, filed Jun. 3, 2004, now U.S. Pat. No. 7,149,661 which claims priority to the Provisional Patent Application identified by U.S. Ser. No. 60/475,668, filed on Jun. 4, 2003, the entire content of which is hereby incorporated herein by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable

INCORPORATION-BY-REFERENCE OF MATERIAL SUBMITTED ON A COMPACT DISC

Not applicable

BACKGROUND OF THE INVENTION

In telecommunication, the incoming information signal is corrupted with noise and jitter. The noise and jitter sources are many, a full description of which is beyond the realm of this application. However, what is important here is that noise and jitter degrades the quality of signal. It is very important the received signal is at a predetermined quality, measured in bit-error rate (BER), Q-Factor (Q), and signal to noise ratio (SNR); BER and SNR are two key parameters used to determine the channel performance.

The quality of signal impacts several transmission and network parameters, such as quality of service, link length, protection strategy, channel reassignment, bandwidth utilization, cost, etc.

In optical communications, because the fiber spans are long and the bit rates are high, channel performance increases in importance and links are more difficult to engineer.

In telecommunications, the current art relies on sophisticated error detecting and correcting codes, known as forward error correction (FEC), that have been added to each information frame. Thus, FEC adds overhead to and ups the line bit-rate of the information channel. Based on the FEC method, typically up to sixteen errors are detected and up to eight are corrected within a frame. From the detected error, the bit error rate (BER) is calculated and thus the channel performance.

However, this method requires several frames (or packets) to estimate the bit error rate and channel performance and thus a long time that compromises the overall system and network responsiveness to remedial action.

BRIEF SUMMARY OF THE INVENTION

In one aspect, the present invention is a method for determining one of a bit error rate and a signal to noise ratio of a photonic signal, comprising the step of: sampling the photonic signal without disrupting the transmission of the photonic signal; and calculating at least one of an estimated bit error rate and a signal to noise ratio utilizing statistical analysis of the sampled photonic signal.

In another aspect, the present invention is a method for determining one of a bit error rate and a signal to noise ratio of a photonic signal, comprising the step of: sampling the photonic signal without disrupting the integrity of the photonic signal; and calculating at least one of an estimated bit error rate and a signal to noise ratio rate utilizing statistical analysis of the sampled photonic signal.

Moreover, another aspect of the present invention is a method for determining one of a bit error rate and a signal to noise ratio rate of a photonic signal, comprising the step of: sampling the photonic signal without introducing a test signal; and calculating at least one of an estimated bit error rate and a signal to noise ratio utilizing statistical analysis of the sampled photonic signal.

DETAILED DESCRIPTION OF THE INVENTION

Introduction:

In telecommunications, the incoming information signal is corrupted with noise and jitter. The noise and jitter sources are many, a full description of which is beyond the realm of this application. However, what is important here is that noise and jitter degrades the quality of signal.

It is very important that the received signal is at a predetermined quality, measured in bit-error rate (BER), Q-factor (Q), and signal to noise ratio (SNR); BER and SNR are two key parameters used to determine the channel performance.

The quality of signal impacts several transmission and network parameters, such as quality of service, link length, protection strategy, channel re-assignment, bandwidth utilization, cost, etc.

In optical communications, because the fiber spans are long and the bit rates are high, channel performance increases in importance and links are more difficult to engineer.

Current Art:

In telecommunications, the current art relies on sophisticated error detecting and correcting codes, known as forward error correction (FEC), that have been added to each information frame. Thus, FEC adds overhead to and ups the line bit-rate of the information channel. Based on the FEC method, typically up to sixteen errors are detected and up to eight are corrected within a frame. From the detected errors, the bit error rate (BER) is calculated and thus the channel performance.

However, this method requires several frames (or packets) to estimate the bit error rate and channel performance and thus a long time that compromises the overall system and network responsiveness to remedial action. For example, at a line rate of 10 Gb/s and for an objective of $10^{-15}$ BER (meaning one error in $10^{15}$ bits), it may take up to 26 hrs, for $10^{-12}$ BER it may take 1.7 min, and for $10^{-10}$ it may take 1 s. Even 1 s is long time for networks that have hundreds or thousands of data streams.

Figure 1:
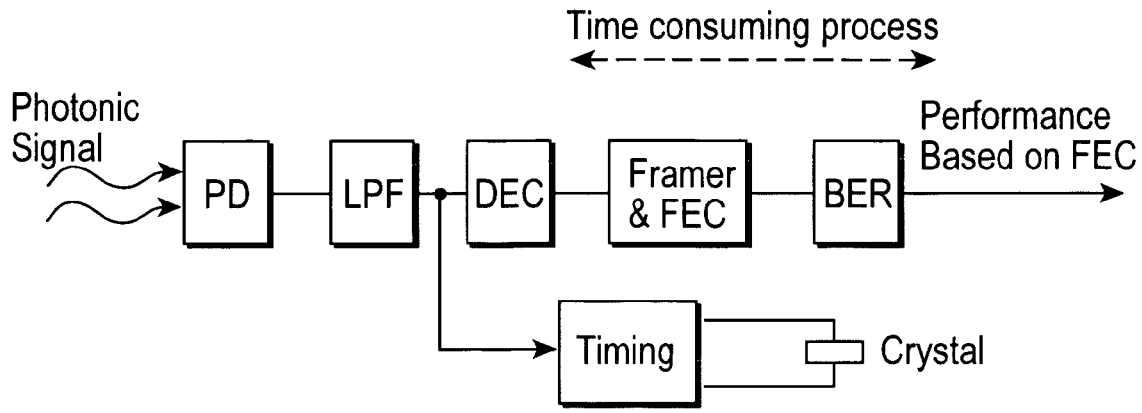
FIG. 1 is a block diagram of a prior art or "current art" forward error correction (FEC) system.

In FIG. 1, the following abbreviations mean the following:
PD=Photodetector
LPF=Low pass filter
DEC=Decision threshold; determines logic "1" and logic "0".
FEC=Forward error detection and correction function
BER=Bit error rate performance function Function of the Circuit in FIG. 1:

The incoming photonic signal is detected by a photodetector (PD), which converts it in an electronic signal; this is passed through a low pass filter (LPF) to remove high frequency noise. The filtered signal is then passed through a decision threshold circuit, which at periodic intervals determines, based on the threshold level, whether the signal at that instant is a logic "1" or logic "0". The timing circuitry extracts timing from the line rate and supplies "clock" to the decision and to subsequent digital circuitry. The binary signal passes through a framer and forward error detection and correction function (Framer & FEC). The latter detects the start of frame and it reads the FEC code in the frame overhead. It then detects errors and corrects errors, and it provides a signal to the bit error rate (BER) function for each error found. Thus, many frames are required to determine the bit error rate and the performance of the signal; this, depending on the performance targets, may take a long time.

Figure 2:
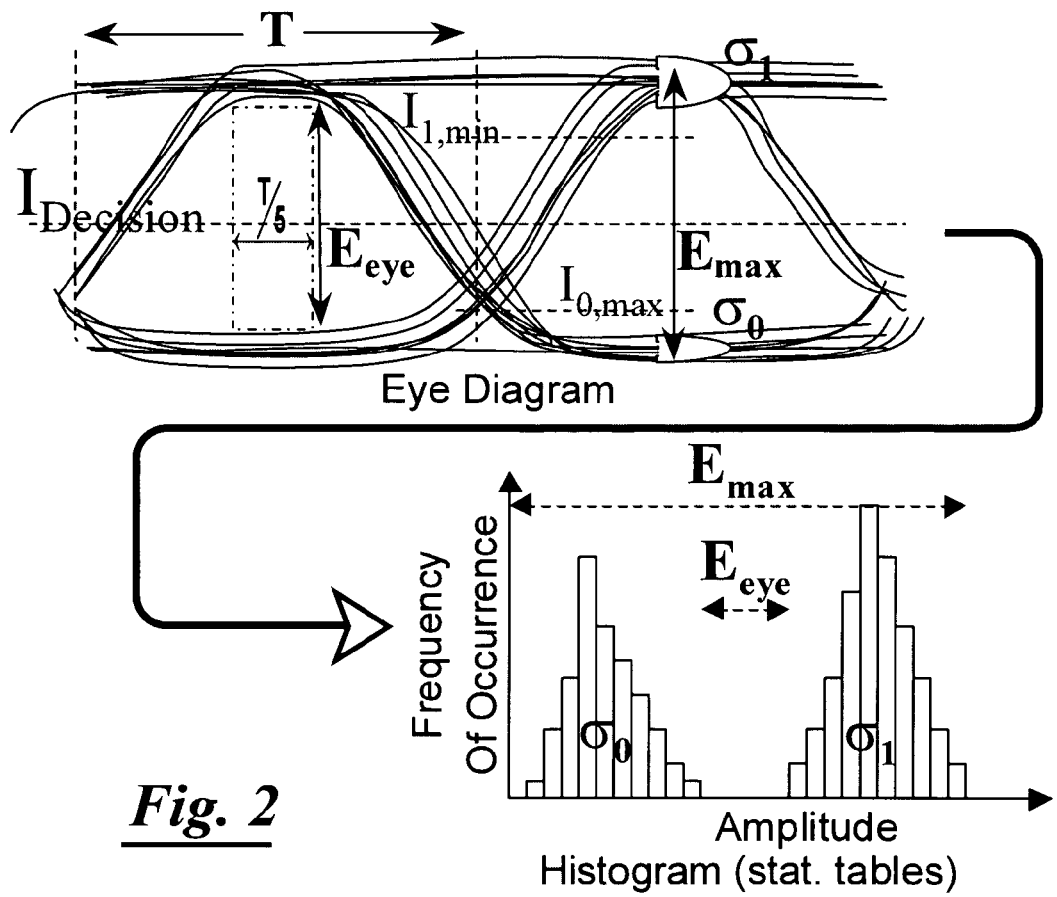
FIG. 2 is a diagram illustrating Bit Error Rate (BER) estimation based on eye diagram and statistical tables.

New Art:

As shown graphically in FIG. 2, the noise and jitter in the signal degrades its quality which is manifested with closure of the "eye diagram". The eye diagram method is used to manually provide a qualitative visual observation of the signal quality; however, it requires costly equipment that makes it cost-prohibitive to incorporate in communications systems on a per channel basis.

Herein, we describe a method and a circuit that automatically (and without human intervention) estimates the BER, SNR, and Q-factor of the incoming signal. The method is based on statistical sampling and therefore the estimates may be made in a much shorter time than the current art. In addition, the method lends itself to implementation with a VLSI and/or microprocessor. We describe two implementations, FIG. 3 and FIG. 4, although this method is not limited to the two implementations described.

The Bit Error Rate can be estimated based on the eye diagram and statistical tables set forth in FIG. 2, as follows:

| 1. Measure: | 2. Calculate: |
|---|---|
| $\sigma_0$ = std deviation for "0" | $E_{eye} = I_{1,\,min} - I_{0,\,max}$ |
| $\sigma_1$ = std deviation for "1" | $Q = E_{max}/\sqrt{\sigma_1^2 + \sigma_0^2}$ |
| $E_{eye}, E_{max}$ | BER = ½ erfc $(Q/\sqrt{2})$ |

Standard Deviation Based on Statistical Tables (Histograms):

The standard deviation, $\sigma$, is calculated from an ensemble of measured values, with which a histogram is made (see previous FIG. 2), from:

$$\sigma = \sqrt{\Sigma(f_j X_j^2)/N - (\Sigma f_j X_j/N)^2} = \sqrt{\overline{X^2} - \overline{X}^2}$$

Where $\overline{X^2}$ is the mean of the squares of various values of X, and $\overline{X}^2$ is the square of the mean of the values of X, N is the number of samples, and $f_j$ is the frequency of occurrence of a value $X_j$.

Similarly mean value, $\Sigma f_j X_j/N$, is calculated by summing the product of frequency of occurrence by the value of the variable X and divide by the sample. The following example demonstrates this:Numerical example:

Consider 65 samples with values $X_j$ and frequencies of occurrence $f_j$ as in the table:

| $X_j$ | $f_j$ | $f_j X_j$ |
|---|---|---|
| 55 | 8 | 440 |
| 65 | 10 | 650 |
| 75 | 16 | 1200 |
| 85 | 14 | 1190 |
| 95 | 10 | 950 |
| 105 | 5 | 525 |
| 115 | 2 | 230 |
| N = 65 | | ΣfX = 5185 |

From this, the mean value is, $\Sigma fX/N = 5185/65 = 83.50$. Based on the f, X, fX, and $fX^2$ values, the standard deviation is easily measured.

SNR:

Based on the eye diagram method, and assuming that the measured value $E_{max}$ corresponds to the received signal+noise, $E_S + E_N$, and that the measured value $E_{eye}$ corresponds to the received signal minus noise, $E_S - E_N$, then an approximated signal to the noise ratio is derived as:

$$SNR = E_S/E_N = (\rho+1)/(\rho-1),$$

where $\rho = E_{max}/E_{eye}$.

The received signal may contain overshoot due to a number of mechanisms and therefore $E_{max}$ and $E_{eye}$ are not exact. Then, an approximated $E^*_{max}$ value may be used to compensate for it, $E^*_{max} = E_{1,\,mean} + k_1\sigma_1$, where $k_1 = 1, 2,$ or $3$ and $E_{1,\,mean}$ is the value for logic "1". Similarly, $E^*_{eye} = (E_1,\,mean - k_1\sigma_1) - (E_{0,\,mean} + k_0\sigma_0)$, where $k_0 = 1, 2,$ or $3$, and $E_{0,\,mean}$ is the mean value for logic 0.

Figure 3:
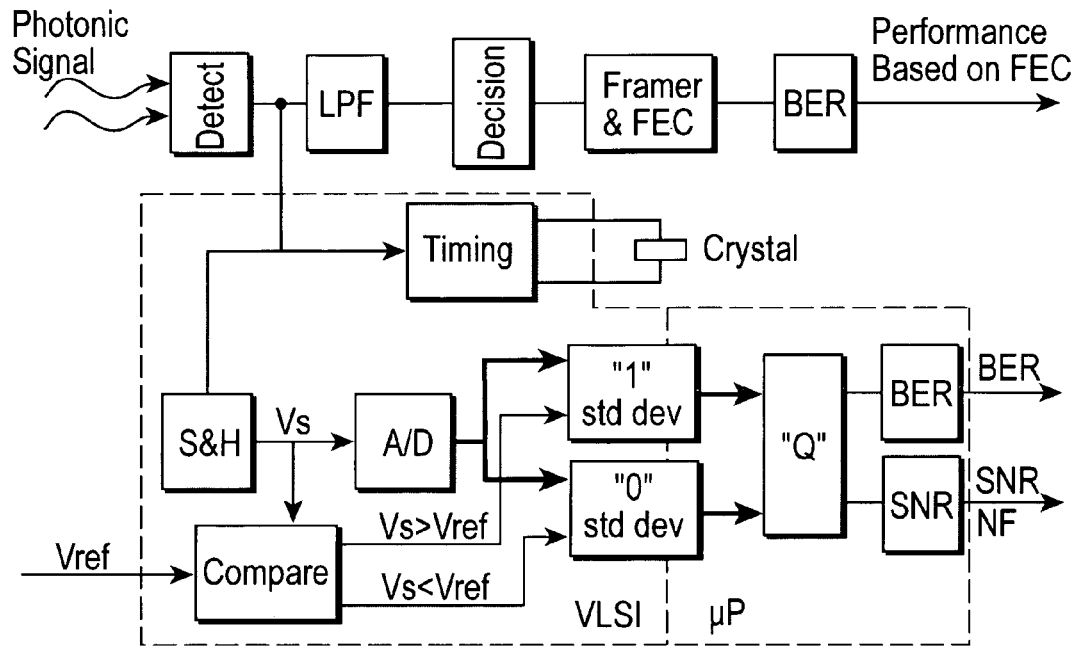
FIG. 3 is a block diagram of a circuit, constructed in accordance with the present invention, for statistical estimation of Bit Error Rate and Signal to Noise Ratio based on pulse sampling.

Function of the Circuit, FIG. 3:

The incoming photonic signal is detected by a photodetector (PD), which converts it in an electronic signal. The electronic signal is routed to a sample and hold (S&H) function that samples periodically the signal and holds for one period the voltage value (Vs). The voltage Vs is sent to a voltage comparator which compares it with a reference voltage (Vref). It is also sent to an analog to digital (A/D) converter function, where it is converted into digital codes.

The binary or digital codes from the A/D is sent to two functions, one that receives those that are greater than Vs, named "1s std dev", and another that receives those that are smaller than Vs, named "0s std dev"; this is controlled by the comparator that generates two enabling signals, Vs>Vref and Vs<Vref, respectively. The "1s std dev" function builds statistical tables for those codes that correspond to Vs>Vref and from their distribution it determines the standard deviation for the "fs". Similarly, the "0s std dev" function builds statistical tables for those codes that correspond to Vs<Vref and from their distribution it determines the standard deviation for the "0s". The two standard deviation functions provide inputs to a functional block that calculates the Q factor and passes information signals to two functions labeled SNR and BER which calculate the estimated signal to noise ratio and the bit error rate, respectively. Because of the statistical nature of this method, a relatively small sample of periods, few thousands, are required. At 10 Gb/s, 10,000 periods correspond to 1 µs.

Implementation of Circuit, FIG. 3:

The circuit consists of few functional blocks that may be implemented with one VLSI or with a VLSI and a low-cost microprocessor (shown in previous FIG. 3); the actual design implementation depends on designer preference and cost.

In one embodiment, the circuit in FIG. 3 may be implemented with a VLSI and a microprocessor. The VLSI consists of timing function, S&H, comparator, A/D and part of the "1s std dev" and "0s std dev" functions. The microprocessor includes the standard deviation calculation function for both "1s" and "0s", the Q, SNR and the BER functions.

In another embodiment, the VLSI consists of the S&H, Comparator, A/D and the "1s std dev" and "0s std dev" functions. The microprocessor includes the Q, SNR and the BER functions.

In another embodiment, a VLSI may contain all functions, including a microprocessor.

Figure 4:
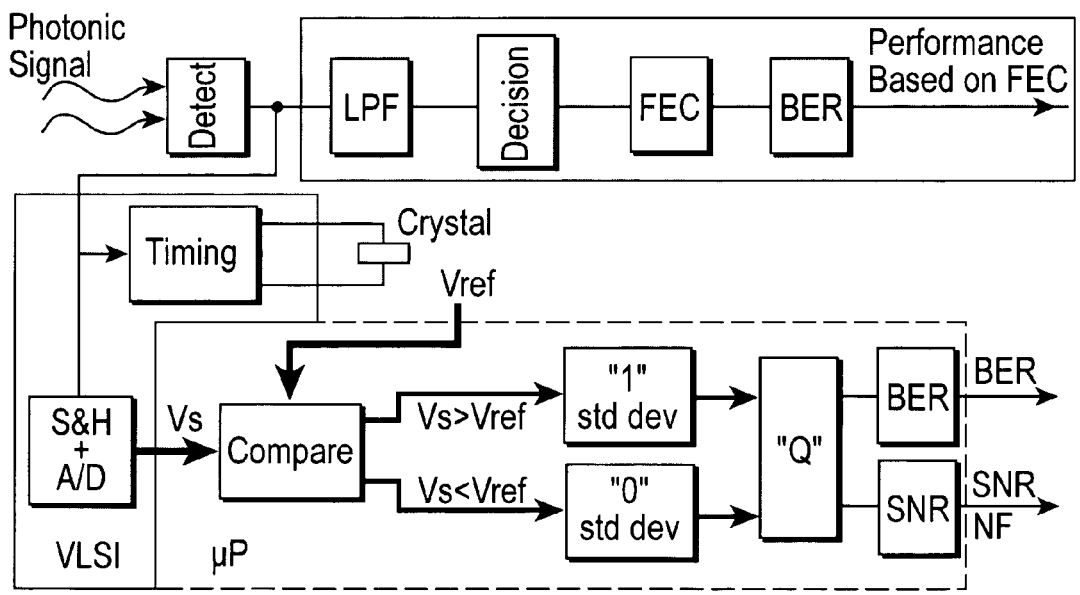
FIG. 4 is a block diagram of another circuit, constructed in accordance with the present invention, for statistical estimation of Bit Error Rate and Signal to Noise Ratio based on pulse sampling.

Function of the Circuit, FIG. 4:

The incoming photonic signal is detected by a photodetector (PD), which converts it into an electronic signal. The electronic signal is routed to a sample and hold (S&H) and analog to digital (A/D) converter function that converts periodically the sampled signal into digital codes. The binary or digital codes from the A/D is sent to a binary comparator that compares them with a reference code. Those codes that correspond to Vs>Vref are sent to the "1s std dev" function and those to Vs<Vref to "0s std dev" function.

The "1s std dev" function builds statistical tables for those codes that correspond to Vs>Vref and from their distribution it determines the "1s" standard deviation. Similarly, the "0s std dev" function builds statistical tables for those codes that correspond to Vs<Vref and from their distribution it determines the "1s" standard deviation.

The two standard deviation function provide inputs to a functional block that calculates the Q factor and it passes information signals to the SNR and BER functions which calculate the estimated signal to noise ratio and the bit error rate, respectively. Like in circuit of FIG. 3, because of the statistical nature of this method, a relatively small sample of periods, few thousands, are required. At 10 Gb/s, 10,000 periods corresponds to 1 µs.

Implementation of Circuit, FIG. 4:

Like the circuit of FIG. 3, the circuit in FIG. 4 consists of few functional blocks that may be implemented with one VLSI or with a VLSI and a low-cost microprocessor; the actual design implementation depends on designer preference and cost.

In one embodiment, the circuit in FIG. 4 may be implemented with a VLSI and a microprocessor. The VLSI consists of the timing and S&H+A/D functions. The microprocessor includes the comparator, the standard deviation calculation function for both "1s" and "0s", the Q, SNR and the BER functions.

In another embodiment, a VLSI may contain all function, including a microprocessor.

The circuit in FIG. 3 is based on a bus architecture and thus it is better embodied in a microprocessor architecture.

Cost Reduction of Circuit in FIGS. 3 and 4:

The circuit in FIG. 3 and FIG. 4 contains a S&H and an A/D function. Assuming a line rate at 10 Gb/s, it means that the function must perform $10^9$ samples and conversions per second; similarly, the remainder of the circuit must operate at the same speed to cope with the data flow in the circuit. To accomplish this, state of the art electronic circuit is required because of the high operational speed of electronics. However, this function may be slowed down by a large factor, for example 1000 times, if one of every 1000 pulses are sampled. Although this does not compromise the accuracy of the method, it does slow it down 1000 times. Assuming that 1000 samples is an adequate statistical ensemble, then a total of 1000×1000 (1,000,000) samples are required. At 10 Gb/s, one million pulses will enter the circuit in 0.1 ms, that is, still a very short time. Thus, slowing down the sampling rate by 1000 allows for lower speed electronics implementable with conventional low cost and low power electronic circuitry. Depending on line rate, other sampling rates may be considered.

In the various embodiments described above, at least one of the calculated estimated bit error rate and the calculated signal to noise ratio is stored.

Benefits

The method and the circuit described has several benefits to quickly provide a statistical estimate of the SNR and BER.

It is based on synchronous statistical sampling of the analog incoming signal

It provides fast estimate of BER based on statistical sampling

It provides fast estimate of SNR and Q based on statistical sampling

It lends itself to easy implementation with integrated IC and/or mu-P

VLSI allows for per channel low cost implementation

REFERENCE

1. S. V. Kartalopoulos, "DWDM: Networks, Devices and Technology", IEEE/Wiley 2003 (to be avail. September 2002).
2. S. V. Kartalopoulos, "Fault Detectability in DWDM: Toward Higher Signal Quality & System Reliability", IEEE 2001.
3. S. V. Kartalopoulos, "On the Performance of Multi-wavelength Optical Paths in High Capacity DWDM Optical Networks", To be submitted for publication.
4. Possible Simulation Tools (for optical physical layer): OpNet, OptiWave Corporation, LinkSim by Rsoft.
5. Possible Simulation Tools (for electronic circuitry): Existing VLSI synthesis and simulation tools.

Potential Interest

Instrumentation manufacturers

Equipment Manufacturers

VLSI Manufacturers

Software simulation developers

It should be understood that the foregoing is intended to be illustrative of the invention, and that the invention is not confined to the particular embodiments set forth herein, but embraces all such modified forms thereof as come within the scope of the following claims.

What is claimed is:

1. A method for determining one of a bit error rate and a signal to noise ratio of a photonic signal, comprising the steps of:

synchronously sampling the photonic signal without disrupting transmission of the photonic signal by;
converting, by a photodetector, the photonic signal into an electrical signal and sampling the electrical signal to be indicative of a sampled photonic signal;
converting the electrical signal to digital codes indicative of the sampled photonic signal;

calculating at least one of an estimated bit error rate and a signal to noise ratio utilizing statistical analysis of the digital codes indicative of the sampled photonic signal; and storing at least one of the calculated estimated bit error rate and the calculated signal to noise ratio.

2. The method of claim 1, wherein the electric signal has a Vs and wherein the step of calculating an estimated bit error rate is defined further as the steps of building a first statistical table for digital codes indicative of the electric signal having Vs>Vref.

3. The method of claim 2, wherein the step of calculating the estimated bit error rate is defined further as the step of building a second statistical table for digital codes indicative of the electrical signal having Vs<Vref.

4. A method for determining one of a bit error rate and a signal to noise ratio of a photonic signal having an integrity, comprising the steps of:

synchronously sampling the photonic signal without disrupting the integrity of the photonic signal by:
converting, by a photodetector, the photonic signal into an electrical signal and sampling the electrical signal to be indicative of a sampled photonic signal;
converting the electrical signal to digital codes indicative of the sampled photonic signal;
calculating at least one of an estimated bit error rate and a signal to noise ratio utilizing statistical analysis of the digital codes indicative of the sampled photonic signal; and
storing at least one of the calculated estimated bit error rate and the calculated signal to noise ratio.

5. The method of claim 4, wherein the electric signal has a Vs and wherein the step of calculating an estimated bit error rate is defined further as the steps of building a first statistical table for digital codes indicative of the electric signal having Vs>Vref.

6. The method in claim 5, wherein the step of calculating the estimated bit error rate is defined further as the step of building a second statistical table for digital codes indicative of the electrical signal having Vs<Vref.

7. A method for determining one of a bit error rate and a signal to noise ratio of a photonic signal, comprising the steps of:

sampling the photonic signal without disrupting transmission of the photonic signal;
calculating at least one of an estimated bit error rate and a signal to noise ratio utilizing statistical analysis of the sampled photonic signal; and
storing at least one of the calculated estimated bit error rate and the calculated signal to noise ratio;
wherein the step of sampling the photonic signal is defined further as the steps of converting the photonic signal into an electrical signal indicative of the photonic signal using a photodetector, and sampling the electric signal;
wherein the step of calculating is defined further as the step of converting the electrical signal to digital codes indicative of the sampled photonic signal; and
wherein the electric signal has a Vs and wherein the step of calculating an estimated bit error rate is defined further as the steps of building a first statistical table for digital codes indicative of the electric signal having Vs>Vref.

8. The method of claim 7, wherein the step of calculating the estimated bit error rate is defined further as the step of building a second statistical table for digital codes indicative of the electrical signal having Vs<Vref.

9. A method for determining one of a bit error rate and a signal to noise ratio of a photonic signal having an integrity, comprising the steps of:

sampling the photonic signal without disrupting the integrity of the photonic signal;
calculating at least one of an estimated bit error rate and a signal to noise ratio utilizing statistical analysis of the sampled photonic signal; and
storing at least one of the calculated estimated bit error rate and the calculated signal to noise ratio;
wherein the step of sampling the photonic signal is defined further as the steps of converting the photonic signal into an electrical signal indicative of the photonic signal using a photodetector, and sampling the electric signal;
wherein the step of calculating is defined further as the step of converting the electrical signal to digital codes indicative of the sampled photonic signal; and
wherein the electric signal has a Vs and wherein the step of calculating an estimated bit error rate is defined further as the steps of building a first statistical table for digital codes indicative of the electric signal having Vs>Vref.

10. The method of claim 9, wherein the step of calculating the estimated bit error rate is defined further as the step of building a second statistical table for digital codes indicative of the electrical signal having Vs<Vref.

* * * * *

UNITED STATES PATENT AND TRADEMARK OFFICE
CERTIFICATE OF CORRECTION

PATENT NO.        : 7,813,899 B2                           Page 1 of 1
APPLICATION NO.   : 11/603700
DATED             : October 12, 2010
INVENTOR(S)       : Stamatios V. Kartalopoulos It is certified that error appears in the above-identified patent and that said Letters Patent is hereby corrected as shown below:

Column 5, line 10: Delete ""is" and replace with -- "1s -- .

Column 5, line 35: Delete ""1s"" and replace with -- "0s" --.

Signed and Sealed this
First Day of February, 2011

David J. Kappos
*Director of the United States Patent and Trademark Office*